Figure 1:
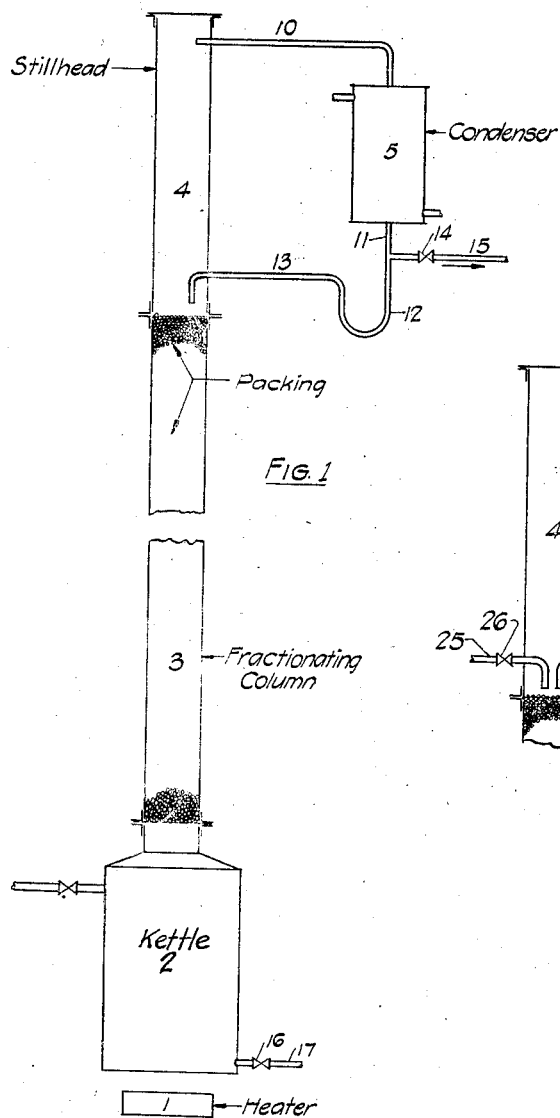

Patented July 12, 1932

1,866,800

UNITED STATES PATENT OFFICE

RICHARD M. DEANESLY, OF BERKELEY, CALIFORNIA, ASSIGNOR TO SHELL DEVELOPMENT COMPANY, OF SAN FRANCISCO, CALIFORNIA, A CORPORATION OF DELAWARE

PROCESS OF INCREASING THE CONCENTRATION OF OLEFINES IN A MIXTURE CONTAINING SAME

Application filed June 5, 1929. Serial No. 368,612.

This invention relates to the concentration of a component of a fluid mixture in said mixture, and particularly to the concentration of a component of a mixture whose components possess little difference in vapor pressure, so that practical concentration by fractional distillation of the mixture is very difficult if not impossible.

The invention consists in adding to such mixtures a substance which has a preferential solvent attraction for one of the components and concentrating this component by fractional distillation of the mixture together with the added substance.

More particularly the invention consists in separating olefine from paraffin hydrocarbons, as for instance butylenes from butane by adding liquid anhydrous ammonia to the mixture of these hydrocarbons, and fractionally distilling the mixture together with the liquid anhydrous ammonia, whereby the olefines will be concentrated in the residue.

Further features and advantages of my invention will appear from the following description thereof, as applied by me. It will be understood that I do not limit myself to the details of the particular method of using my invention which is described hereafter, but I extend my claims for the principle of my invention in scope and equivalents as far as the state of the prior art will allow.

The present invention is applicable to many similar mixtures but will be described particularly as I have used it for the separation of butylene from a mixture with butane. The boiling points of the various hydrocarbons concerned are:

| | | ° F. |
|---|---|---|
| Paraffin | normal butane | 32 |
| Olefine | alpha butylene | 23 |
| | gamma butylene | 21 |
| | beta butylene | 34 |

The slightness of the difference between the boiling points of alpha and gamma butylene and normal butane renders it very difficult, even after repeated distillation, to effect a complete separation, while the separation of a mixture of butane and beta butylene is quite impracticable.

I have found that liquid anhydrous ammonia has a solvent action for hydrocarbons and that this solvent action is stronger for butylenes than for butane, and, as a consequence, lowers the vapor pressure of butylenes to a greater extent than that of butane. This property enables the efficient concentration, by fractional distillation in presence of liquid anhydrous ammonia of butylene in mixtures of butylene and butane, which would be inseparable or difficultly separable if no liquid anhydrous ammonia were present. In the absence of liquid anhydrous ammonia the distillate will be somewhat, but not greatly, richer in alpha and gamma butylene because of their slightly lower boiling points relative to butane; by the addition of liquid anhydrous ammonia the butylene becomes strongly concentrated in the residue, notwithstanding its lower boiling point.

Other features of the invention will be mentioned below after the explanation of the attached drawing, which by way of example illustrates more or less diagrammatically an apparatus designed to carry a preferred application of my invention into effect.

The apparatus for carrying out the fractional distillation of the mixture of butane, butylene, and liquid anhydrous ammonia, shown in Fig. 1 of the drawing, consists of: heater 1, kettle 2, fractionating column 3, still head 4, and condenser 5. In the operation of this apparatus, the mixture, the components of which are to be separated, is introduced in the kettle 2, and distilled by means of heater 1; the vapors evolved will rise through the packed fractionating column 3, the fractionated products arriving in still head 4, from where they pass through pipe 10 to condenser 5. The condensate is removed at the bottom of the condenser through pipe 11 and partly used as reflux, being passed back into the lower part of the still and through gooseneck 12 and pipe 13; it is partly removed from the system through valve 14, and line 15. The still residue in the kettle may be removed through valve 16 and line 17.

Figure 2:
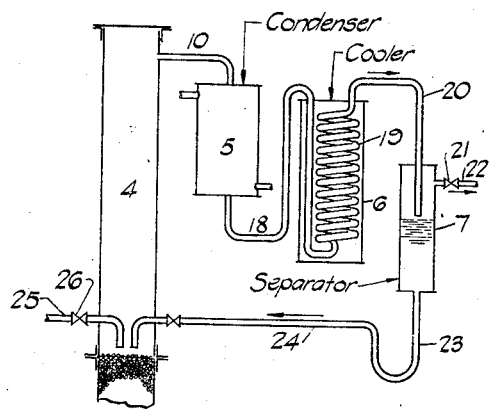

Figure 2 shows a more complicated structure, in which only certain components of the condensate from the still head are used as reflux. After leaving the condenser 5 the distillate in this modified arrangement is passed through cooler 6 and separator 7, by means of line 18, cooling coil 19, and line 20. In the separator 7 the distillate settles in two layers, the top one of which is removed, wholly or partially, through valve 21 and line 22, while the bottom layer is used as reflux if desired with some portion of the upper layer; the reflux passes through gooseneck 23 and line 24 back into the column. Additional reflux liquid may be introduced through pipe 25 and valve 26.

As a specific example of one distillation, I may state the following approximate figures, without limiting my invention thereby in any respect; a batch of 100 parts of a mixture, consisting of 18 parts of butylene, 27 parts of butane and 55 parts of liquid anhydrous ammonia, was fractionally distilled in a column of the type of Fig. 1, at a still head temperature of about 132° F., and about 375 lbs. pressure (gauge). At the end of the distillation the distillate formed about 73 parts, the residue 27 parts. The 73 parts distillate consisted roughly of 4.5 parts butylene, 26.5 parts butane, and 42 parts liquid anhydrous ammonia; the 27 parts residue consisted of 13.5 parts butylene, 0.5 parts butane, and 13 parts liquid anhydrous ammonia.

From these figures it will be seen, that I started with a mixture of 40% butylene and 60% butane; in the residue the proportion at the end of the distillation was 96% butylene to 4% butane. After removing the liquid anhydrous ammonia, I had obtained butylene in 96% pure condition. In the beginning of the distillation hardly any butylene came over in the distillate, samples of the condensate showing only 6% butylene in proportion to the total hydrocarbon content; this gradually increased, and at the end of the distillation a sample of the condensate then being formed contained about 40% of butylene. The total distillate contained only 14% butylene calculated on the basis of its total hydrocarbon content (4.5 parts on 26.5 parts butane).

The process of my invention may be carried out as well continuously as in batches. The apparatus consists mostly of equipment of conventional design; in actual operation more parts and instruments may be desirable which for the clearness of the description have been omitted here, as they can readily be supplied by those skilled in the art. The process can be operated over a fairly wide range of temperature and pressure without impairing seriously its efficiency; besides the above mentioned temperature of 132° F. with a pressure of 375 lbs., I have also successfully operated with butane-butylene mixtures at 110° F. and a corresponding pressure of around 300 lbs. Without limiting myself, I may state that my process will work satisfactorily on the separation of butylene from butane with pressures from 200 to 400 lbs. and temperatures from 75 to 150° F., depending mostly on the character of the mixture treated.

The distillate and still residue may be withdrawn and freed from ammonia by washing with water, or in any other convenient way.

As an improvement on the above described process used with a column as in Fig. 1, I have found that if I cool a mixture of butane-butylene and liquid anhydrous ammonia, such as I obtain from the still head of any fractionating column, below a certain temperature, the mixture will separate into two layers, the lower layer of which consists chiefly of liquid anhydrous ammonia, while most of the hydrocarbons are contained in the top layer. This temperature is not above 110° F., and decreases with increase in the proportion of butylene present, being approximately 65° F. when the proportion of butylene to butane is 7 to 3. By using the bottom layer as reflux, I confine most of the liquid anhydrous ammonia to the system; by circulating it I need a smaller quantity, and I obviate the necessity of separating large quantities of liquid anhydrous ammonia from the distillate and reintroducing these into the system. I also avoid refluxing the butane from the distillate back into the column. Taking the figures mentioned above, the 73 parts of distillate, consisting of 4.5 parts butylene, 26.5 parts butane and 42 parts liquid anhydrous ammonia, will on cooling below 80° F. settle in two layers, the bottom layer consisting roughly of one part of butylene, 2 butane and 38 liquid anhydrous ammonia, which layer is used as reflux. The top layer, consisting of 3.5 butylene, 25 butane and 4 liquid anhydrous ammonia, is removed from the system, wholly or in part as desired. Figure 2 shows a modification of the top of the column of Fig. 1, which structure is adapted to carry this improvement into effect.

As a further modification I may introduce an additional quantity of reflux liquid through pipe 25. This is particularly useful in the case of lower boiling hydrocarbons, such as propylene and propane, the boiling points of which approach that of liquid anhydrous ammonia. The quantity of liquid anhydrous ammonia otherwise would probably not be sufficient to prevent propylene from passing over with the distillate, and the additional quantity introduced improves the scrubbing action. It will be understood that I introduce anhydrous ammonia in the liquid state through pipe 25.

If it is desired to use my invention for the concentration of highly volatile olefines in gaseous mixtures not easily or conveniently liquefiable, a high pressure gas scrubbing system may be used in which liquid anhydrous ammonia is employed as scrubbing solvent; the pressure in the system is preferably kept above 150 lbs. From the scrubber a mixture of liquid anhydrous ammonia, olefines and usually some small amount of paraffins, is withdrawn and subjected to a distillation such as has been described.

If desired, instead of liquid anhydrous ammonia, methylamine might be used for the separation of olefines from mixtures with paraffins.

I claim as my invention:

1. A process for increasing the concentration of olefines in a mixture of olefine and paraffin hydrocarbons, comprising: fractionally distilling the mixture in the presence of a nitrogenous solvent with a preferential attraction for the olefine fraction.

2. A process for increasing the concentration of olefines in a mixture of olefine and paraffin hydrocarbons, comprising: adding liquid anhydrous ammonia to the mixture and fractionally distilling the mixture together with the ammonia.

3. A process for increasing the concentration of butylene in a mixture of butylene and butane, comprising: adding liquid anhydrous ammonia to the mixture and fractionally distilling the mixture together with the ammonia, using part of the distillate as reflux.

4. A process for increasing the concentration of butylene in a mixture of butylene and butane, in a part of the mixture, comprising: adding liquid anhydrous ammonia to the mixture and fractionally distilling the mixture together with the ammonia, cooling the distillate and allowing it to settle in two layers, and using the bottom layer, containing mostly ammonia to provide the greater part of the reflux.

5. A process for increasing the concentration of olefines in a mixture of olefines and paraffin hydrocarbons, comprising: adding liquid anhydrous ammonia as reflux to the mixture and fractionally distilling the mixture together with the ammonia, while adding additional ammonia as reflux.

6. A process for the separation of olefines from a gaseous mixture of olefines and saturated aliphatic hydrocarbons, comprising: scrubbing the gaseous mixture with liquid anhydrous ammonia under pressure and fractionally distilling the resultant enriched scrubbing liquid.

7. A process for increasing the concentration of olefines in a mixture of olefine and paraffin hydrocarbons, comprising contacting a nitrogenous solvent of the class consisting of liquid anhydrous ammonia and methylamine with the mixture and fractionally distilling the mixture.

8. A process for increasing the concentration of butylene in a mixture of butylene and butane, comprising contacting a nitrogenous solvent of the class consisting of liquid anhydrous ammonia and methylamine with the mixture and fractionally distilling the mixture.

9. Same as claim 7 wherein part of the distillate is used as reflux.

10. Same as claim 8 wherein part of the distillate is used as reflux.

11. A process for increasing the concentration of olefines in a mixture of olefine and paraffin hydrocarbons, comprising contacting methylamine with the mixture and fractionally distilling the mixture.

12. A process for increasing the concentration of butylene in a mixture of butylene and butane, comprising contacting methylamine with the mixture and fractionally distilling the mixture.

13. Same as claim 7 wherein the process is carried out under a temperature of from about 75° F. to about 150° F.

14. Same as claim 8 wherein the process is carried out under a temperature of from about 75° F. to about 150° F.

15. In a closed cyclic process for concentrating olefines in a hydrocarbon mixture containing the same with paraffin hydrocarbons, the steps of passing heated evolved vapors of the mixture through a zone of liquid anhydrous ammonia, fractionating the vaporous mixture, recovering the ammonia and returning a substantial portion of the recovered ammonia to the zone of liquid anhydrous ammonia.

16. A process for increasing the concentration of olefines in a mixture of olefine and paraffin hydrocarbons containing the same number of carbon atoms comprising adding liquid anhydrous ammonia to the mixture and fractionally distilling the mixture together with the ammonia.

17. A process for increasing the concentration of olefines in a mixture of olefine and paraffin hydrocarbons containing the same number of carbon atoms comprising adding liquid anhydrous ammonia to the mixture and fractionally distilling the mixture together with the ammonia, using part of the distillate as a reflux.

18. A process for increasing the concentration of olefines in a mixture of olefine and paraffin hydrocarbons containing the same number of carbon atoms comprising adding liquid anhydrous ammonia to the mixture and fractionally distilling the mixture together with the ammonia, cooling the distillate and allowing it to settle in two layers, and using the layer containing mostly ammonia, to provide the greater part of the reflux.

19. A process for increasing the concentration of olefines in a mixture of olefine and paraffin hydrocarbons containing the same number of carbon atoms comprising contacting methylamine with the mixture and fractionally distilling the mixture.

In testimony whereof, I have hereunto set my hand.

RICHARD M. DEANESLY.